United States Patent
Rosenshein et al.

(10) Patent No.: US 10,346,806 B2
(45) Date of Patent: ***Jul. 9, 2019

(54) YAHRZEIT SYSTEM AND METHOD

(75) Inventors: Norman Rosenshein, Charlottesville, VA (US); Robert M. Zweiman, Fort Lee, NJ (US); Joseph Zoldan, Canton, OH (US); Warren S. Dolny, Boynton Beach, FL (US)

(73) Assignee: JEWISH WAR VETERANS, U.S. NATIONAL MEMORIAL, INC., Washington, DC (US)

( * ) Notice: Subject to any disclaimer, the term of this patent is extended or adjusted under 35 U.S.C. 154(b) by 660 days.

This patent is subject to a terminal disclaimer.

(21) Appl. No.: 13/473,382

(22) Filed: May 16, 2012

(65) Prior Publication Data

US 2012/0224459 A1    Sep. 6, 2012

Related U.S. Application Data

(63) Continuation of application No. 12/395,099, filed on Feb. 27, 2009, now Pat. No. 8,230,345.

(60) Provisional application No. 61/032,262, filed on Feb. 28, 2008.

(51) Int. Cl.
    *G04B 19/24*    (2006.01)
    *G06Q 10/10*    (2012.01)

(52) U.S. Cl.
    CPC ..... *G06Q 10/109* (2013.01); *Y10S 707/99931* (2013.01); *Y10S 707/99942* (2013.01); *Y10S 707/99945* (2013.01)

(58) Field of Classification Search
    None
    See application file for complete search history.

(56) References Cited

U.S. PATENT DOCUMENTS

| | | | |
|---|---|---|---|
| 6,108,640 A * | 8/2000 | Slotznick | G06F 17/21 |
| | | | 704/9 |
| 7,349,920 B1 * | 3/2008 | Feinberg et al. | |
| 8,938,434 B2 * | 1/2015 | Jain | G06F 17/30958 |
| | | | 707/706 |
| 2002/0135541 A1 | 9/2002 | Kowalewski | |
| 2003/0083109 A1 * | 5/2003 | King et al. | 455/566 |
| 2003/0126180 A1 * | 7/2003 | Bogart et al. | 709/100 |
| 2003/0167253 A1 * | 9/2003 | Meinig | 707/1 |
| 2003/0191688 A1 | 10/2003 | Prince, III et al. | |
| 2004/0210420 A1 * | 10/2004 | Lee | 702/186 |
| 2005/0149497 A1 * | 7/2005 | Cookson et al. | 707/3 |

(Continued)

OTHER PUBLICATIONS

Declaration Under 37 C.F.R. § 1.132 executed Nov. 18, 2011.

(Continued)

*Primary Examiner* — Tuan S Nguyen
(74) *Attorney, Agent, or Firm* — Arent Fox LLP

(57) ABSTRACT

A method of and system for providing an electronic Yahrzeit display corresponding to the current date including determining a current date, performing a search in a database storing a plurality of Yahrzeit entries to identify the Yahrzeit entries having an anniversary of the death date corresponding to the current date, and electronically displaying the identified Yahrzeit entries in a rotating manner, wherein each of the identified Yahrzeit entries are displayed for a predetermined amount of time, wherein the method and system may convert dates between a plurality of calendars.

24 Claims, 6 Drawing Sheets

(56) References Cited

U.S. PATENT DOCUMENTS

| | | | |
|---|---|---|---|
| 2005/0256725 A1 | 11/2005 | Harris | |
| 2007/0179778 A1* | 8/2007 | Gong | H04M 3/4931 |
| | | | 704/9 |
| 2007/0214193 A1* | 9/2007 | Takahashi et al. | 707/202 |
| 2007/0233736 A1* | 10/2007 | Xiong et al. | 707/104.1 |
| 2007/0272743 A1* | 11/2007 | Christie | G06Q 20/06 |
| | | | 235/381 |
| 2007/0294418 A1* | 12/2007 | Wils | H04L 29/06 |
| | | | 709/229 |
| 2008/0097876 A1* | 4/2008 | White et al. | 705/28 |
| 2008/0154828 A1* | 6/2008 | Antebi | G06N 5/022 |
| | | | 706/46 |

OTHER PUBLICATIONS

National Museum of American Jewish Military History Feb. 8, 2007, Mar. 10, 2005 and Feb. 18, 2005, www.nmajmh.org.

Planned legacy, Electronic yahrzeit Memorial from PlannedLegacy.com, Apr. 17, 2007 by You Tube available at http://www.youtube.com/watch?v=tEQBQ6tbHIA.

Canadian Office Action dated Sep. 23, 2015 for Canadian Patent Application No. 2,751,418.

Israeli Office Action of related Israeli Patent Application No. IL232271 dated Feb. 1, 2018.

Translation of Israeli Office Action of related Israeli Patent Application No. IL232271 dated Jan. 23, 2019.

\* cited by examiner

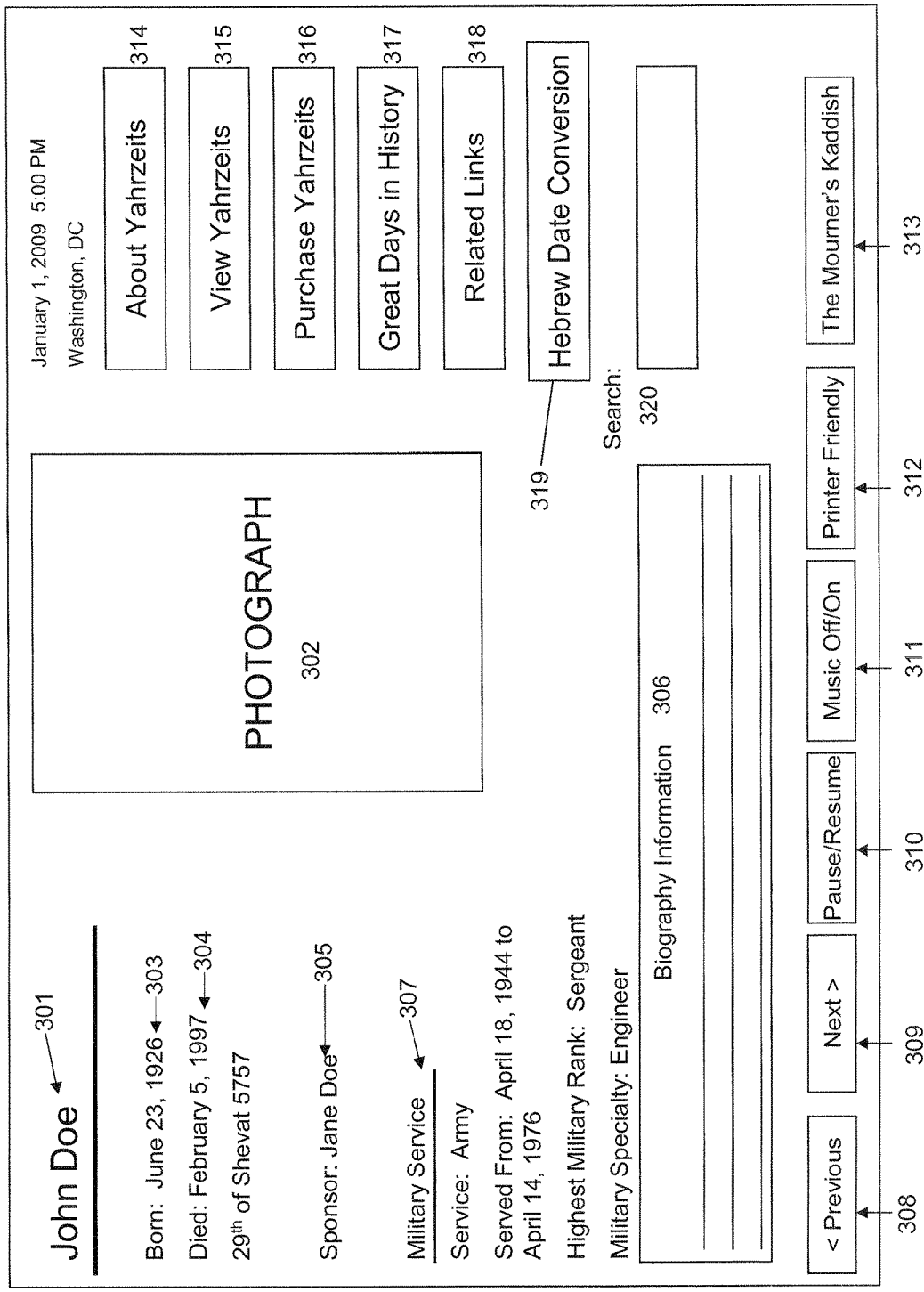

Name to be enrolled: (donation of $100.00) (25 characters) _____

JWV/JWVA/Descendants/NAM Affiliation (if applicable) (23 characters) _____

Highest position held in above (24 characters) _____

Post/Aux./Chpt. (20 characters) _____ No. _____

Service information (if applicable)

Branch of Service (20 characters) _____ Theatre of Operation _____

Service dates: From _____ To _____ Rank _____

Medals and Citations _____

Corps/Specialty (20 characters) _____

Date of Birth _____ Date of Death _____ ( ) before ( ) after sunset Photograph enclosed: yes ___ no ___

Next of Kin (1) _____

Relationship (20 characters) _____

Address(s) _____

City _____ State _____ ZIP Code _____

Phone: _____ Email _____

Next of Kin (2) _____

Relationship (20 characters) _____

Address(s) _____

City _____ State _____ ZIP Code _____

Phone: _____ Email _____

Sponsor name (1) (24 characters) _____

Biography: (Please use additional separate sheet if necessary)
_____
_____

I (please check one) ☐ APPROVE ☐ OBJECT to inclusion of the Yahrzeit in online format.

FIG. 4

SEARCH RESULTS

Name 1    Date of Death
Name 2    Date of Death
Name 3    Date of Death
Name 4    Date of Death
Name 5    Date of Death Simple Search    601

Advanced Search    602

FIG. 6

YAHRZEIT SYSTEM AND METHOD

CROSS-REFERENCE TO RELATED APPLICATION

This is a Continuation Application of U.S. patent application Ser. No. 12/395,099, filed Feb. 27, 2009; which claims priority to Provisional Application No. 61/032,262, filed Feb. 28, 2008. The disclosures of these prior applications are hereby incorporated herein its entirety by reference.

BACKGROUND OF THE INVENTION

Field of the Invention

This invention relates generally to a method, system, and computer program product that includes features to electronically or otherwise assist in the collection and display of Yahrzeit information.

Background of the Technology

A Yahrzeit, or anniversary of the death of a relative, is observed as a solemn occasion in all branches of Judaism. A special candle is lit, burning for the full twenty four hours of the anniversary date. The Hebrew date of death is regarded as an anniversary in the years after a person's passing. For centuries, it was traditional to mark the occasion by visiting the gravesite of the person. In modern society, with its mobility and scattering of families, such visits are not always possible. Thus, other forms of remembrance have become necessary.

Currently, Yahrzeit information may be manually displayed.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. One purpose is to present some concepts of one or more aspects in a simplified form as a prelude to the more detailed description that is presented later.

Aspects in accordance with the present invention overcome the above identified problems of the prior art, as well as others, by providing methods and systems for electronically or otherwise gathering, managing, and displaying Yahrzeit information.

In an aspect, a method of providing an electronic Yahrzeit display corresponding to the current date, includes determining a current date; performing a search in a database storing a plurality of Yahrzeit entries to identify the Yahrzeit entries having an anniversary of the death date corresponding to the current date; and presenting the identified Yahrzeit entries in a rotating manner, wherein each of the identified Yahrzeit entries are displayed for a predetermined amount of time.

In another aspect, the method may further include the current date being determined in a first calendar, calculating a conversion date for the current date in a second calendar; and wherein performing the search includes identifying the Yahrzeit entries having an anniversary of the death date corresponding to the current date in the first calendar and the conversion date in the second calendar.

In another aspect, the method the first and second calendars may selected from a group consisting of the Gregorian calendar, the Hebrew calendar, the Chinese calendar, the Hindu calendar, the Julian calendar, and the Muslim calendar. For example, the first and second calendars may be the Gregorian and Hebrew calendars.

In another aspect, the method further includes managing the plurality of Yahrzeit entries stored in the database, including entering a new Yahrzeit entry; and deduplicating the plurality of Yahrzeit entries. Deduplicating the plurality of Yahrzeit entries may include establishing a predetermined amount of identical information to trigger a deduplication. Deduplication may occur automatically upon the entry of a duplicative Yahrzeit entry and/or may include a prompt is made to a user when a Yahrzeit entry is entered having a predetermined amount of identical information to an existing Yahrzeit entry. The prompt may further include displaying information for the existing entry and the duplicative entry; and providing a link to further information for both entries.

In another aspect, a system for providing a rotating display of a plurality of Yahrzeits corresponding to an anniversary date includes means for determining a current date; means for performing a search in a database storing a plurality of Yahrzeit entries to identify the Yahrzeit entries having an anniversary of the death date corresponding to the current date; and means for presenting the identified Yahrzeit entries in a rotating manner, wherein each of the identified Yahrzeit entries are presented for a predetermined amount of time.

In another aspect, a system for providing a rotating display of a plurality of Yahrzeits corresponding to an anniversary date includes a processor for determining a current date; a repository accessible by the processor for storing a plurality of Yahrzeit entries; wherein the processor performs a search in the repository to identify the Yahrzeit entries having an anniversary of the death date corresponding to the current date; and a user interface functioning via the processor for presenting the identified Yahrzeit entries in a rotating manner, wherein each of the identified Yahrzeit entries are presented for a predetermined amount of time.

In another aspect, a computer program product comprises a computer usable medium having control logic stored therein for causing a computer to provide a rotating display of a plurality of Yahrzeits corresponding to an anniversary date, the control logic comprising: first computer readable program code means for determining a current date; second computer readable program code means for performing a search in a database storing a plurality of Yahrzeit entries to identify the Yahrzeit entries having an anniversary of the death date corresponding to the current date; and third computer readable program code means for presenting the identified Yahrzeit entries in a rotating manner, wherein each of the identified Yahrzeit entries are presented for a predetermined amount of time.

In another aspect, at least one processor configured to provide a rotating display of a plurality of Yahrzeits corresponding to an anniversary date, includes a first module for determining a current date; and a second module for performing a search in a database storing a plurality of Yahrzeit entries to identify the Yahrzeit entries having an anniversary of the death date corresponding to the current date; and a third module for presenting the identified Yahrzeit entries in a rotating manner, wherein each of the identified Yahrzeit entries are presented for a predetermined amount of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. Additional advantages and novel features in accordance with aspects of the invention will be set forth in part in the description that follows, and in part will become more apparent to those skilled in the art upon examination of the following or upon learning by practice of the aspects.

BRIEF DESCRIPTION OF THE FIGURES

The disclosed aspects will hereinafter be described in conjunction with the appended drawings, provided to illustrate and not to limit the disclosed aspects, wherein like designations denote like elements, and in which:

FIG. 3 illustrates an exemplary user interface in accordance with aspects of the present invention;

FIG. 4 illustrates an exemplary form for the collection and entry of Yahrzeit information in accordance with aspects of the present invention;

FIG. 6 illustrates an exemplary user interface for a search application in accordance with aspects of the present invention.

DETAILED DESCRIPTION

It should be apparent that the aspects herein may be embodied in a wide variety of forms and that any specific structure, function, or both being disclosed herein is merely representative. An aspect disclosed herein may be implemented independently of other aspects, and two or more of these aspects may be combined in various ways.

It is to be recognized that depending on the aspect, certain acts, or events of any of the methods described herein, can be performed in a different sequence, may be added, merged, or left out together (e.g., not all described acts or events are necessary for the practice of the application). Moreover, in certain aspects, acts or events may be performed concurrently rather than sequentially.

Aspects in accordance with one variation of the present invention include an electronic or otherwise automated or partially automated Yahrzeit system that enables the collection of a plurality of Yahrzeit entries, the collection of information regarding persons connected to a Yahrzeit entry, and the presentation of a plurality of Yahrzeit entries in connection with other features. The presentation may be electronic and may be a visual display, an audio communication, and/or a combination of an audio and a visual presentation. As used herein, a Yahrzeit entry includes memorial type information related to an anniversary of a deceased persons life or death.

Figure 1:
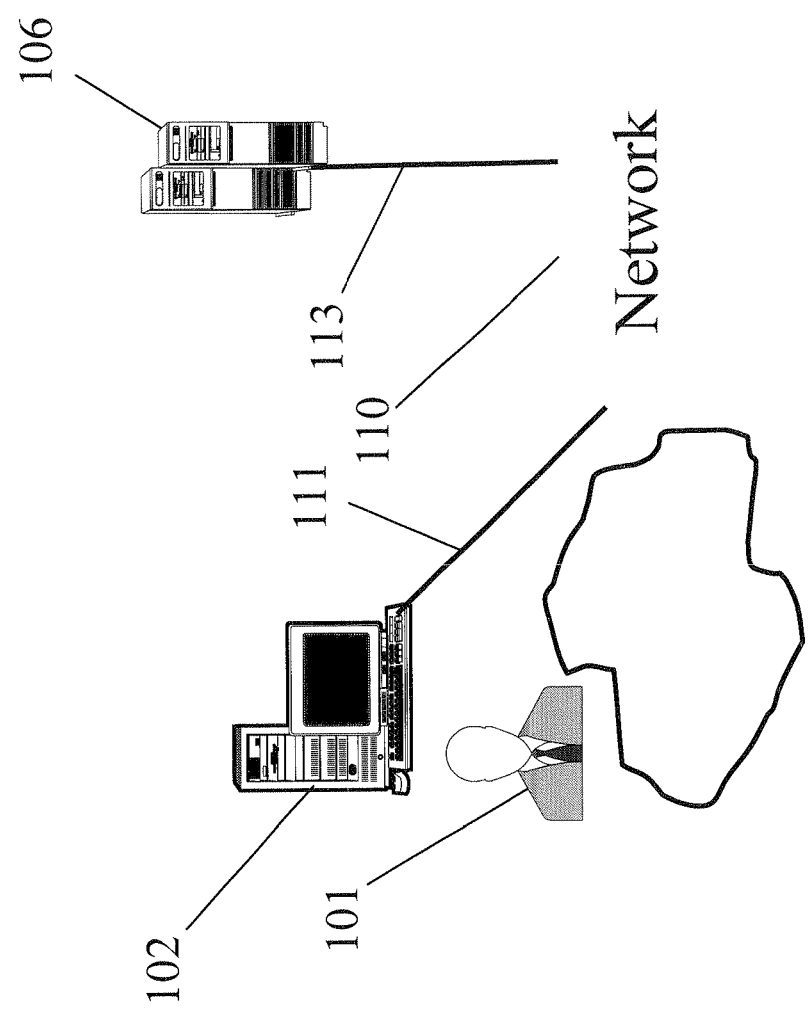
FIG. 1 shows various features of an example computer system for use in conjunction with aspects of the present invention.

FIG. 1 shows various features of an example computer system for use in conjunction with aspects of the present invention. As shown in FIG. 1, the computer system is used by a user 101 to access data, make calculations, and perform other steps in accordance with methods of the present invention, such as by using software and other computer features located on a server or other network device 106. Access occurs, for example, via a terminal 102, network (e.g., the Internet) 110, and couplings 111, 113. The terminal 102 may comprise, for example, a personal computer (PC), minicomputer, mainframe computer, microcomputer, telephone device, personal digital assistant (PDA), or other device having a processor and input capability. The server 106 may comprise, for example, a PC, minicomputer, mainframe computer, microcomputer, or other device having a processor and a repository for data or that is capable of accessing a repository of data. Couplings 111, 112 may include wired, wireless, or fiberoptic links.

Figure 2:
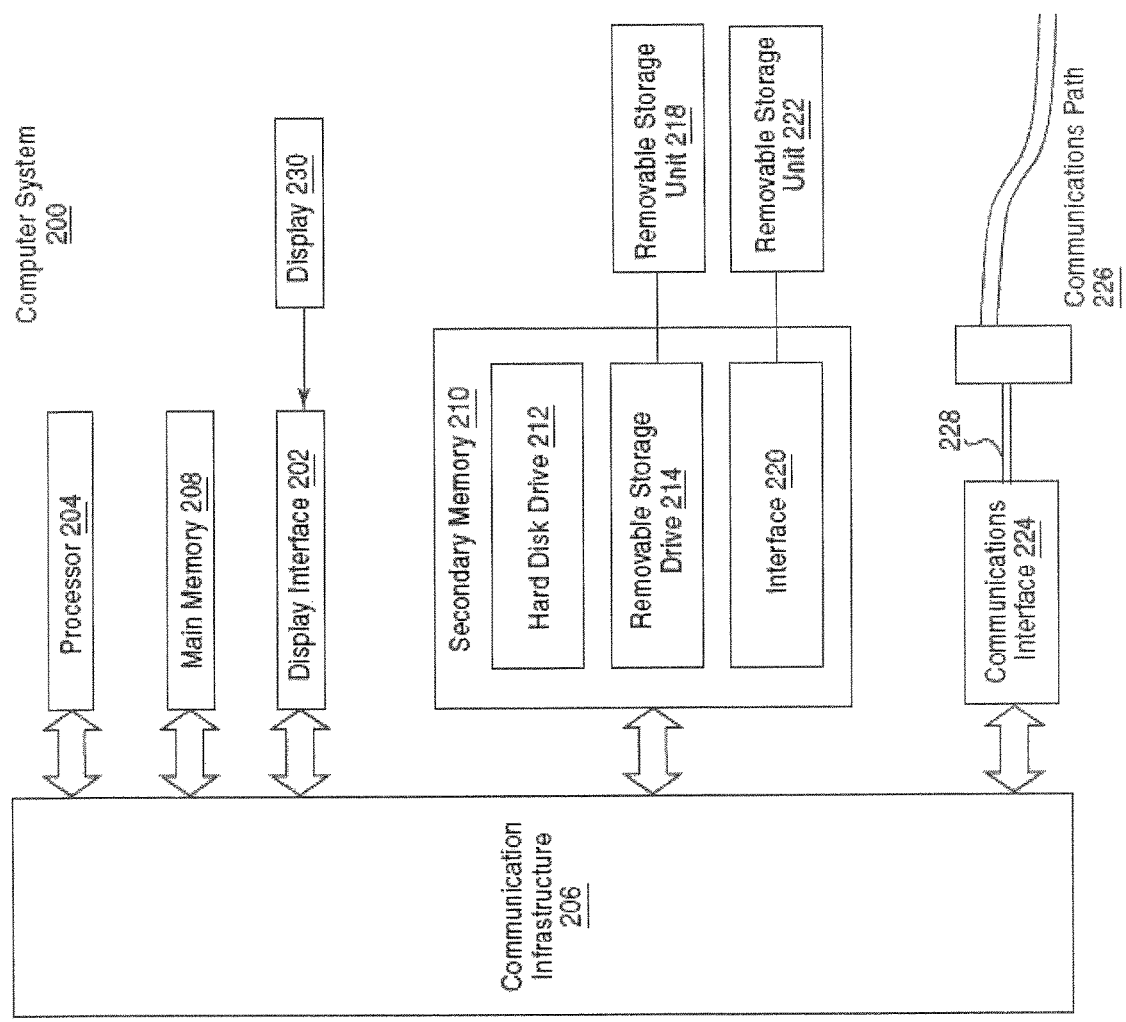
FIG. 2 presents an exemplary system diagram of various hardware components and other features, in accordance with aspects of the present invention.

The present invention may be implemented using hardware, software or a combination thereof and may be implemented in one or more computer systems or other processing systems. In one variation, the invention is directed toward one or more computer systems capable of carrying out the functionality described herein. An example of such a computer system 200 is shown in FIG. 2.

Computer system 200 includes one or more processors, such as processor 204. The processor 204 is connected to a communication infrastructure 206 (e.g., a communications bus, cross-over bar, or network). Various software variations are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative aspects, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In a variation where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another variation, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another variation, the invention is implemented using a combination of both hardware and software.

FIG. 3 illustrates aspects of an exemplary Yahrzeit display format or an illustrative user interface in accordance with aspects of the present invention. The Yahrzeit display 300 may include a name 301 of a Yahrzeit entry, a corresponding photograph or other picture 302, a birth date 303, and a date of the person's death 304. Dates may be listed in more than one type of calendar date. For example, FIG. 3 illustrates the date of the person's death being listed in both the Gregorian calendar date of Feb. 5, 1997, and the Hebrew calendar date of the $29^{th}$ of Shevat 5757. The death must have taken place after sundown. Otherwise, the date conversion would be the $28^{th}$ of Shevat 5757. Thus, the system allows for dates to be converted to calendars that begin dates at different times of day. For example, at sunset versus at midnight. The system may take into account whether an event occurred after sunset by receiving an indication from a user. The display may list a sponsor, relative, and/or next of kin 305 for the Yahrzeit entry. Although only one sponsor is illustrated, more than one person may be listed. The display may include a biography section 306 with a description of events in the life of the Yahrzeit entry.

The display may further include a customized section 307 corresponding to a specific activity or group. The Yahrzeit system and method may be customized for a specific group, such as a veteran's group. For example, for many veterans, their military service was a pivotal point in their lives. A customized veteran's Yahrzeit system may recognize veterans for their achievements in the context that meant so much to them, by including a summary of their military service, for example. For example, FIG. 3 shows that section 307 may include, among others, a heading listing Military Service, and listing of the branch of military, dates served in the military, highest military rank obtained, and military specialty for the Yahrzeit entry 301.

Although FIG. 3 illustrates an example for Veterans, the customized section may include customized information relating to any group or organization, such as, among others, memberships in associations, religious groups, educational groups or institutions. For example, if the customized section is customized for a membership in an association, the section may include information on which local branch of the association the person participated, a timeframe of participation, positions held in the association, etc. The customized section may include more than one type of information. For example, the customized section 307 may include the military service information as illustrated in FIG. 3 as well as additional information on participation in a particular Veteran's association.

A number of features may be provided at a user interface for manipulating the display of Yahrzeit entries. Among others, such features may include elements for moving to the previous Yahrzeit entry 308 or to the next Yahrzeit entry 309, an element 310 for pausing on a particular Yahrzeit entry or for continuing to scroll through the entries, an element 311 for muting music played along with the displayed entries, an element 312 for selecting a printer friendly view of the Yahrzeit entry, and an element 313 for viewing information relevant to mourners. For example, element 313 is illustrated as providing a link to the Mourner's Kaddish. Among others, element 313 may provide a similar link to other religious text relevant to mourning, or the celebration of life and ancestors.

The user interface may include additional features that provide access to additional information. For example, FIG. 3 illustrates a number of exemplary buttons or other selection features that may be provided at a user interface. These buttons may include a button 314 for selecting information about Yahrzeits. Selecting this feature may direct the user to a display of further information about the history and purpose of Yahrzeits, as well as additional information regarding the particular Yahrzeit system that the user is viewing. Another button 315 may allow the user to view Yahrzeits in the current system. Thus, if a user has moved to another section of the Yahrzeit system, button 315 will return the user to a display of Yahrzeit entries. Another button 316 may be provided to allow a user to request entry of a new Yahrzeit. This may include purchasing a Yahrzeit, or making a payment in order to have a new Yahrzeit entry included in the database. For example, a relative may wish to purchase a Yahrzeit entry for a deceased person. They can enter information to be included in the Yahrzeit entry for the deceased person and provide payment to have the Yahrzeit entry displayed on the anniversary of their death. The system may be configured to display the Yahrzeit entry indefinitely or for a predetermined number of years. Although button 316 is illustrated as requesting a payment, the system may also allow a user to submit an entry without payment, based on the desires of the system manager.

The Purchase Yahrzeit button 316 may link to a form that may be printed or filled out electronically and printed. This button may also link to a web interface that allows the user to electronically transmit their purchase of a Yahrzeit entry. The purchase Yahrzeit button may link to a form such as the exemplary form in FIG. 4.

Another button 317 may allow a user to select information about Great Days in History, for example. This feature may provide further information regarding important events that occurred on the same date in past years. This information may change according to the date. Thus, on February 1, the Great Days in History button 317 may provide further information on other important events occurring in history on February 1. These historical events may be further linked to the provider of the Yahrzeit system. For example, if the Yahrzeit system is being provided by a Veteran's group, the Great Days in History may include important military events.

A list of upcoming historical events may also be provided. A preselected number of upcoming great historical events may be listed. For example, the next five events may be displayed. The historical events may be observed according to any selected calendar. For example, the anniversary dates of the events may be observed by either the Hebrew or Gregorian calendar anniversary, or both. Upon selection of this feature by a user, the events may be listed along with such information as a hyperlink to more detailed information, the date (in at least one type of calendar), a title, a short description, etc.

The Great Days in History button 317 may alternatively include a standard list of important events in history that do not correspond to the current date.

A link may also be provided for each event that will allow the user to view the Yahrzeit entries corresponding to that day, the date of the event. The link may also allow the user to view Yahrzeit entries having some connection to the event.

Another button 318 may be provided to provide a user with related links to other electronic information related to the Yahrzeit display. In addition, a button 319 may be included that provides a user with an application for converting dates between different calendars. FIG. 3 illustrates button 319 providing an application to the user to allow a conversion of dates between the Hebrew calendar and the Gregorian calendar. However, a conversion may be made between any two calendars. This button may display a user interface such as the exemplary user interface shown in FIG. 5.

Figure 5:
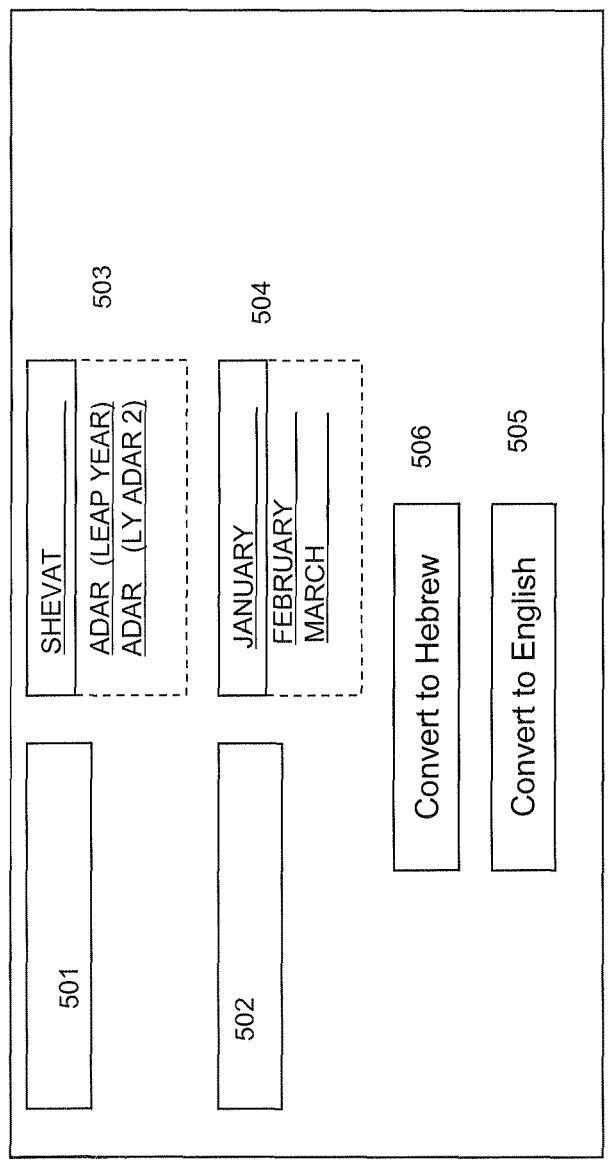
FIG. 5 illustrates an exemplary user interface for a calendar converter in accordance with aspects of the present invention.

FIG. 5 illustrates a first section 501 for the entry of a date in a first calendar, and a second section 502 for the entry of a date in a second calendar. A drop down menu 503, 504, for example, or other selection feature may be provided to prompt the user on the standard information for each calendar. A user may then select a conversion to either the first 505 or the second 506 calendar.

A search feature 320 may also be included that allows a user to search for a particular Yahrzeit entry. The search feature may provide a section 320 for a user to input and/or select a search term. Once a search term is input, a list of entries relevant to the search term are displayed. An exemplary display is illustrated in FIG. 6. The entries are ranked according to relevance to the search term. Dates may be provided in more than one calendar. Thus, the death date may be listed for both the Gregorian calendar date of death and the Hebrew calendar date of death. A link is provided to each entry to allow the user to access the full Yahrzeit entry.

In addition, a simple search 601 and an advanced search option 602 may be provided to allow a user to perform a more directed search. For example, the simple search option 601 may provide a section for the name of the deceased to be input, a section for the date of death to be input, and a section that allows the user to designate a type of calendar to be used for the dates. For example, the user may select between the Gregorian and Hebrew calendars for inputting dates.

The advanced search option 602 may allow for the search criteria described for the simple search and additionally provide for search criteria based on the birth date of the deceased, the time of day that the deceased died, the name of a person related to the deceased, such as a next of kin or sponsor, a search term to be applied in a search of the biography section of the Yahrzeit, a branch of service, a post/auxiliary/chapter, and honors received. For example, the time of day section may allow a user to input whether to search both before and after sunset, before sunset, or after sunset on the dates to be used as search terms.

The ability to search based on information regarding survivors, next of kin, and sponsors may be limited to administrators only in order to protect privacy.

The search feature may also include a button that links to a separate search page. The search page may provide the simple search and advanced search options as discussed above.

Among other items, the Yahrzeit display may include a time of day and the physical location corresponding to the time of day, and an option to view a text-only version of a Yahrzeit entry.

FIG. 4 illustrates exemplary information that may be collected as part of a purchase of a Yahrzeit entry. For example, the purchase Yahrzeit button 316 in FIG. 3 may link to a form allowing a user to input information for each of the categories illustrated in FIG. 4. Among others, there may be sections that allow a user to input the name of the person to be enrolled, a date of birth, a date of death, whether the events on those dates occurred before or after sunset, whether a photograph will be enclosed or attached, information regarding the person to be enrolled's next of kin, a sponsor name for the person to be enrolled, and biography information. The form may allow a connection to a particular group to be input. FIG. 4 gives an example, for an association to the Jewish War Veterans (JWV), where the form allows the user to input a connection to JWV, Jewish War Veterans Auxiliary (JWVA), National Memorial Inc. (NMI), or the connection of a relative to these associations, as well as any positions held in the particular group, such as a highest position held, a chapter/post/or auxiliary of the group.

If the Yahrzeit program is being provided by a particular group, the form may further allow the entry of information common to the group. For example, if the group is a Veteran's group, the form may allow for the entry of information regarding a branch of service, a theatre of operation, service dates, medals and citations, and a corp or specialty.

The Yahrzeit system may include a limited display at a particular location, such as a kiosk, an online display, or a combination of both. If the system includes both options, the purchase form may further allow a user to designate whether they approve the entry to be displayed in an online format.

Another aspect of the present invention includes the electronic display of a plurality of Yahrzeit entries in a scrolling fashion, wherein each Yahrzeit entry is displayed or otherwise presented in turn for a predetermined period of time. This presentation may include, for example, displaying a specific group of Yahrzeit during a selected time, wherein the specific entries are selected from a plurality of Yahrzeit entries. This aspect may include displaying a group of Yahrzeit entries only on a day corresponding to the anniversary of their death.

Each Yahrzeit entry may include information regarding an individual such as the individual's birth date, death date, positions held, military background, biographical information, residence information, family information, career information, pictures or other graphics, sponsor information, etc.

Another aspect of the present invention includes automatically or otherwise calculating corresponding dates between different calendars so that an individual Yahrzeit entry with a death date listed using one type of calendar can be displayed on a corresponding anniversary day in a different calendar. For example, an individual Yahrzeit entry may list a death date based on the Hebrew calendar. In years such as leap years on the Hebrew calendar, the corresponding anniversary day in another calendar, such as the Gregorian calendar may change each year. In accordance with this aspect of the present invention, the system may automatically or otherwise calculate a corresponding anniversary date for each Yahrzeit entry's death date for the calendar year in which the entries will be displayed. The calendars involved may include any of the Gregorian calendar, the Chinese calendar, the Hindu calendar, the Hebrew calendar, the Julian calendar, the Muslim calendar, etc.

Each entry may then be displayed on the anniversary according to any of the chosen calendars. For example, if the selected calendars are the Gregorian and Hebrew calendars, the entry will be displayed on both the Gregorian anniversary and the Hebrew calendar date of the anniversary. It is noted that the determination of a Yahrzeit observance is separate from the conversion between the Gregorian and Hebrew dates.

The Yahrzeits selected for display each day may be changed at a predetermined time. For example, the scrolling display may change to the next date each day at sunset. The scrolling display may change to the next day at a predetermined time. For example, if the system is located in Washington, D.C., the anniversary date may be changed at 5:00 PM EST each day.

Display Options

In an aspect of the present invention, the Yahrzeit system may be configured to display, for example, continuously scrolling Yahrzeit entries on a website, on a predetermined screen at a particular location, such as at a kiosk, on both the Internet and at a predetermined location, etc. For example, if the Yahrzeit system is configured to simultaneously display Yahrzeit entries for the current calendar date both on the Internet and at a stationary display such as a kiosk, different levels of interaction may be provided between the two types of display. For example, the display via the Internet may allow user interaction similar to that described above for FIGS. 3-6, whereas the stationary display may provide limited capabilities to a user.

The collection of Yahrzeit entries may be stored in a central database that is accessed by two separate applications, one for an Internet version of the display and one for a stationary display. Alternatively, for example, two separate databases may be created so that each application accesses a separate, but similar collection of Yahrzeit entries.

The scrolling display may be implemented by providing a continuous rotation of Yahrzeit entries. The scrolling may occur through a requery to a web server for a new Yahrzeit after a predetermined amount of time. For example, a requery may be made to a server every 15 seconds. In order to reduce the amount of wait time experienced by a user, the scrolling or rotating display may include feeding or preloading new Yahrzeit entries to a user's display in a hidden frame on a browser. Thus, the Yahrzeits are displayed as they arrive on the page, but the queries for remaining Yahrzeits are not displayed to the user.

In order to display the plurality of Yahrzeit entries on their anniversary date, first, a current date may be determined. Then, a date conversion may be performed in order to convert the date to a corresponding date in a different calendar. Then, for example, a first search may be performed in a database to search for Yahrzeit entries having anniversary dates corresponding to either the current date or the converted date. An identifier for each Yahrzeit entry identified in the search is returned in a first result. A query may be performed for a predetermined number of the Yahrzeit entries identified in the first result. For example, the predetermined number may be 10, and a query may be made for the full Yahrzeit entries corresponding to the first 10 Yahrzeit identifiers in the first result.

This information may be loaded up into arrays such as javascript arrays and sent to a display. The first Yahrzeit entry is displayed for a scrolling period. The scrolling period may be a predetermined number of seconds, such as five seconds. A timer calculates the scrolling period. Once the first Yahrzeit entry has been displayed for the scrolling period, a rotation function deletes the first element in the array and redisplays the next Yahrzeit entry, the new first element in the array.

A hidden frame may be used to call a page on the web server and to request a new set of Yahrzeit entries, i.e. the next 10 entries on the list of identified Yahrzeit entries for the day. A server may return the next batch of Yahrzeit entries loaded into an array to the hidden frame a page.

Upon loading, the hidden frame will update the arrays on the main page with the new Yahrzeit entry information. A timer may be used to periodically check the length of the Yahrzeit arrays on a parent frame. When the number of Yahrzeit entries stored drops below a predetermined number, a query will once again be sent to the server for the next batch of Yahrzeit entries.

Entry of Information

Yahrzeit entries may be entered directly by a system manager, for example. Information for Yahrzeit entries may also be entered remotely via the Internet.

In an aspect, a donor or sponsor may request entry and/or purchase Yahrzeit entry information via a website. The website may be accessed via a link that may be included on a plurality of websites. This link, may be depicted, for example as a button labeled "Purchase Yahrzeit." As part of this aspect, all Yahrzeit entries may be sent to a system manager for review and approval before the entry is included in the Yahrzeit display.

One aspect of the system allows for the pre-registration of entries by a sponsor. These entries are entered into the system without a death date. Without a death date, the entry may not be included in the Yahrzeit display. In order to activate the entry, a death date may be entered either by the sponsor or by a system manager. At this point, the entry will be displayed as a standard entry.

Automatic Deduplication

Another aspect of the present invention includes an automatic or otherwise enableable deduplication feature, wherein an automatic prompt is provided to a system manager when two records are found in the plurality of Yahrzeit entries with specified amount of matching criteria. The criteria may include, for example, a Yahrzeit individual's name, birth date, and death date. Other criteria may also include an address, city and state of residence, a telephone number, a sponsor name, etc. In one aspect, an automatic prompt is provided to a system manager if two Yahrzeit entries are found to have identical criteria, including at least a Yahrzeit individual's name, wherein the name includes a matching middle name or middle initial, a birth date, and a death date.

The automatic prompt may be provided, for example, to the system manager at the time that the duplicative entry is first entered into the system. However, the automatic prompt may also be provided after a review of entries previously entered into the system.

The automatic prompt, for example, allows the system manager to determine whether to keep both entries with matching criteria. The prompt displays the duplicative criteria and provides links to additional information regarding each entry identified as being duplicative. Therefore, the system manager can investigate any duplicative entry directly from the automatic prompt.

Manage Persons

Another aspect of the present invention may include a feature to manage persons related to individual Yahrzeit entries. Related persons may include sponsors, donors, relatives, next of kin, etc. This feature includes the capability to identify related persons as being active, inactive, deceased, including a special status, etc. A special status may include a request to receive only a particular type of notification regarding the Yahrzeit entries or for only particular Yahrzeit entries with which they are connected.

Another aspect of the present invention allows information regarding the related persons to be updated, such as a change of address, etc. A person may be related as a sponsor, donor, or next of kin, for example, to a plurality of Yahrzeit entries. If the address, status (deceased), or other information, regarding the related person is altered in connection with one of these Yahrzeit entries, the information for that related person may be globally updated for on all of the Yahrzeit entries with which they are listed, connected, etc.

Another aspect of the present invention allows a system manager to access a page that lists some or all information regarding a sponsor, a donor, or a next of kin individual. This page may include information for all Yahrzeits for which the individual is either a sponsor, a donor, or a next of kin. This page may also include the capability to update status information for the individual as it relates to each Yahrzeit to which the individual is connected. For example, the page may include the capability to change the active/inactive status, notification status, deceased status, etc., for a plurality of individual Yahrzeit entries.

This aspect of the present invention may include retaining information on deceased sponsors and next of kin, and identifying these individuals as deceased and "not notify" for notifications. This aspect includes retaining the related person as sponsors and/or next of kin listed on a displayed Yahrzeit entry, without requiring that further notifications be sent to the related person.

This aspect may further include a link to each of the Yahrzeit entries to which the person is related, such that a system manager or other user can access the individual Yahrzeit entries by, for example, clicking on a link on the sponsor, next of kin, or donor page.

Another aspect of the present invention includes an automatic or otherwise enableable deduplication of records for persons related to Yahrzeit entries. Similar to the description above for the deduplication of Yahrzeit entries, this aspect includes determining whether there is a predetermined criteria match for at least two records of related persons. These criteria may include at least first and last name, address, residence city, phone number, etc.

The system may further includes an administrative section that allows a system manager or other user to take and include notes regarding a Yahrzeit entry or a related person. Notes may include information on the timing and/or reason for changes to an entry, biographical information, pictures and/or graphic information, etc., for a Yahrzeit entry or a related person entry.

Yahrzeit Notices

Another aspect of the present invention includes the automatic or otherwise generation of notices. A notice may include an e-mail, letter, other correspondence, etc., generated to a person related to a Yahrzeit entry. For example, an anniversary notice may be sent to all donors, sponsors, and next of kin associated with each Yahrzeit entry in connection with the anniversary of the death date of the Yahrzeit entry. Other notices may include requests for donations, notification of events, etc.

An aspect of the system automatically or otherwise determines whether multiple notices will be sent to the same recipient, and combines the information from the multiple notices into one notice to be sent to the recipient. For example, a recipient may be a sponsor or next of kin for a plurality of Yahrzeit entries. Another aspect may include storing information regarding whether a notice has been previously generated for a Sponsor or Survivor in a predetermined amount of time. For example, the system may notify an administrator that a Sponsor has already received a notice within the past year by displaying that information. A record may be kept in a database or other data repository of all reminders and notices that have been previously generated in order to prevent administrators from sending duplicate reminders.

A further aspect of the Yahrzeit system may include automatically or otherwise creating mailing lists from sponsor, donor, next of kin, etc., information. This aspect may include exporting information for at least a selected group of individuals to automatically generate letters or correspondence regarding fundraising, requests for memorabilia, etc.

Other aspects of the present invention may include features that allow sending automatic notices, collecting payment information electronically, such as online, creating relationships between various fields such as between the relationship, fee, and notify fields, and providing queries to search and remove duplicate entries.

The Yahrzeit system may prepare automatic or otherwise generated reports. For example, an automatic report may be generated at specified intervals regarding Yahrzeit entries received but awaiting receipt or confirmation or payment, and pre-enrolled Yahrzeit entries awaiting activation.

Example variations of the present invention have now been described in accordance with the above advantages. It will be appreciated that these examples are merely illustrative of aspects of the invention. Many variations and modifications will be apparent to those skilled in the art.

What is claimed is:

1. A method of providing an electronic Yahrzeit display corresponding to a current date, the method comprising:
   determining the current date, wherein the current date is determined in a first calendar;
   calculating a conversion date for the current date in a second calendar;
   performing a search in a Yahrzeit entry database storing a plurality of Yahrzeit entries and identifying a first set of all Yahrzeit entries having an anniversary of death date corresponding to the current date in the first calendar and the conversion date in the second calendar;

retrieving a predetermined subset of Yahrzeit entries from the first set of Yahrzeit entries, and loading the predetermined subset of Yahrzeit entries into an array;

presenting the predetermined subset of Yahrzeit entries in a rotating manner at a stationary display or via an online display by displaying a first Yahrzeit entry of the predetermined subset for a predetermined amount of time and removing the first Yahrzeit entry from the array after the predetermined amount of time and displaying a next Yahrzeit entry in the array for the predetermined amount of time and removing the next Yahrzeit entry from the array, wherein the rotating manner continues to display and remove Yahrzeit entries from the array for the predetermined amount of time, and wherein each of the predetermined subset of Yahrzeit entries designates whether to display the identified Yahrzeit entry at the stationary display, via the online display, or both at the stationary display and via the online display;

providing a link for each of the Yahrzeit entries that corresponds to at least one person related to a respective Yahrzeit entry, the at least one person being a sponsor of the Yahrzeit entry; and at least one step selected from a group consisting of:
providing a printer friendly display of the Yahrzeit entry;
providing an option to search the Yahrzeit entry database; and
transmitting a form for the purchase of a Yahrzeit entry.

2. The method of claim 1, wherein the first and second calendars are selected from a group consisting of a Gregorian calendar, a Hebrew calendar, a Chinese calendar, a Hindu calendar, a Julian calendar, and a Muslim calendar.

3. The method of claim 2, wherein the first and second calendars are selected from a group consisting of the Gregorian calendar and the Hebrew calendar.

4. The method of claim 1, wherein displaying a Yahrzeit entry includes displaying information selected from a group consisting of a birth date, a death date, a next of kin, a surviving relative, a sponsor, information on military service, information on membership in a group, a photograph, and biography information.

5. The method of claim 4, wherein one of the birth date and death date are displayed and at least one of the dates is shown for both a first calendar and a second calendar.

6. The method of claim 1, further comprising:
providing a link at a user interface with further information for at least one selected from a group consisting of general Yahrzeit information, great days in history, related links, and information related to mourning.

7. The method of claim 6, wherein a link is provided to information regarding great days in history, further comprising:
listing a historical event corresponding to the current date; and
updating the historical event to be listed based on the current date.

8. The method of claim 7, further comprising:
providing a link to a Yahrzeit entry having a connection to the historical event.

9. The method of claim 1, further comprising:
managing the plurality of Yahrzeit entries stored in the database, including:
entering a new Yahrzeit entry; and
deduplicating the plurality of Yahrzeit entries.

10. The method of claim 9, wherein deduplicating the plurality of Yahrzeit entries includes:
establishing a predetermined amount of identical information to trigger a deduplication.

11. The method of claim 10, wherein deduplication occurs automatically upon the entry of a duplicative Yahrzeit entry.

12. The method of claim 10, wherein a prompt is made to a user when a Yahrzeit entry is entered having a predetermined amount of identical information to an existing Yahrzeit entry.

13. The method of claim 12, further comprising:
displaying information for the existing entry and the duplicative entry; and
providing a link to further information for both entries.

14. The method of claim 9, further comprising:
storing a sponsor record for the sponsor of the Yahrzeit entry.

15. The method of claim 14, further comprising:
linking the sponsor record to a plurality of Yahrzeit entries.

16. The method of claim 15, further comprising:
globally updating information in the sponsor record such that the sponsor record information is corrected in each of the plurality of Yahrzeit entries to which it is linked.

17. The method of claim 16, wherein the sponsor record includes a status indicator, and wherein the status indicator includes at least one selected from a group consisting of active, inactive, deceased, and a special status.

18. The method of claim 16, further comprising:
generating a notice for a sponsor regarding a Yahrzeit entry.

19. The method of claim 18, further comprising:
indicating whether a notice has been previously generated for the sponsor.

20. The method of claim 1, wherein displaying the subset of Yahrzeit entries in a rotating manner includes:
electronically presenting the identified Yahrzeit entries via at least one of a visual display and an audio communication.

21. The method of claim 1, wherein displaying the subset of Yahrzeit entries in a rotating manner further comprises:
feeding a Yahrzeit entry from the array to a user's terminal in a hidden frame on a browser at the user's terminal; and
receiving a next subset of Yahrzeit entries to load into the array.

22. The method of claim 1, wherein the stationary display is a kiosk.

23. The method of claim 1, wherein presenting the subset of Yahrzeit entries in a rotating manner further includes:
receiving a group identifier; and
displaying the identified Yahrzeit entries that match the group identifier during the predetermined amount of time.

24. The method of claim 1 wherein the stationary display or online display further comprises:
a previous entry selection element for switching from a current Yahrzeit entry of the predetermined subset to a previous Yahrzeit entry of the predetermined subset; and
a next entry selection element for switching from a current Yahrzeit entry of the predetermined subset to a next Yahrzeit entry of the predetermined subset.

* * * * *